United States Patent [19]

Ressel et al.

[11] Patent Number: 4,705,671
[45] Date of Patent: Nov. 10, 1987

[54] APPARATUS FOR REDUCING IRON AND VANADIUM IN PHOSPHORIC ACID SOLUTION

[75] Inventors: Herbert Ressel, Erftstadt; Wilhelm Westphal, Brühl, both of Fed. Rep. of Germany

[73] Assignee: Hoechst Aktiengesellschaft, Fed. Rep. of Germany

[21] Appl. No.: 782,722

[22] Filed: Oct. 1, 1985

[30] Foreign Application Priority Data

Oct. 15, 1984 [DE] Fed. Rep. of Germany ....... 3437689

[51] Int. Cl.$^4$ .............................................. B01J 19/28
[52] U.S. Cl. ...................................... 422/189; 34/126; 422/209; 422/225; 422/233; 423/321 R
[58] Field of Search .................. 423/321 R, 320 R; 34/126, 127, 134, 135, 136, 137; 422/147, 209, 233, 210, 225, 189, 191; 202/100, 136; 127/1, 5

[56] References Cited

U.S. PATENT DOCUMENTS

| | | | |
|---|---|---|---|
| 1,667,549 | 4/1928 | Hechenbleikner | 423/320 |
| 1,875,879 | 9/1932 | McKee | 422/209 |
| 2,521,896 | 9/1950 | Burwell | 422/209 |
| 3,007,690 | 11/1961 | Koniewiez | 422/209 |
| 3,160,669 | 12/1964 | Terao et al. | 422/225 |
| 3,392,003 | 7/1968 | Partridge et al. | 422/233 |
| 3,544,269 | 12/1970 | Rushton | 423/321 R |
| 3,574,557 | 4/1971 | Gentilli | 422/209 |
| 3,617,226 | 11/1971 | List et al. | 422/209 |
| 3,935,298 | 1/1976 | Sugahara et al. | 423/320 |
| 4,304,608 | 12/1981 | Regnault et al. | 422/209 |
| 4,362,701 | 12/1982 | Krüger et al. | 422/209 |
| 4,394,349 | 7/1983 | Cartmell | 422/147 |
| 4,485,078 | 11/1984 | Weston et al. | 423/321 R |
| 4,521,379 | 6/1985 | Beane | 34/135 |

OTHER PUBLICATIONS

Perry's-5th Edition, pp. 19–43.

Primary Examiner—Michael S. Marcus
Attorney, Agent, or Firm—Connolly and Hutz

[57] ABSTRACT

Apparatus for reducing iron and vanadium in phosphoric acid solution with the aid of a granular reductant. The apparatus is comprised of a drum rotatable around its transverse axis. It is partially filled with the granular reductant and provided with inlets for supplying the phosphoric acid solution, the granular reductant and an inert gas, and also with a reaction product outlet.

4 Claims, 1 Drawing Figure

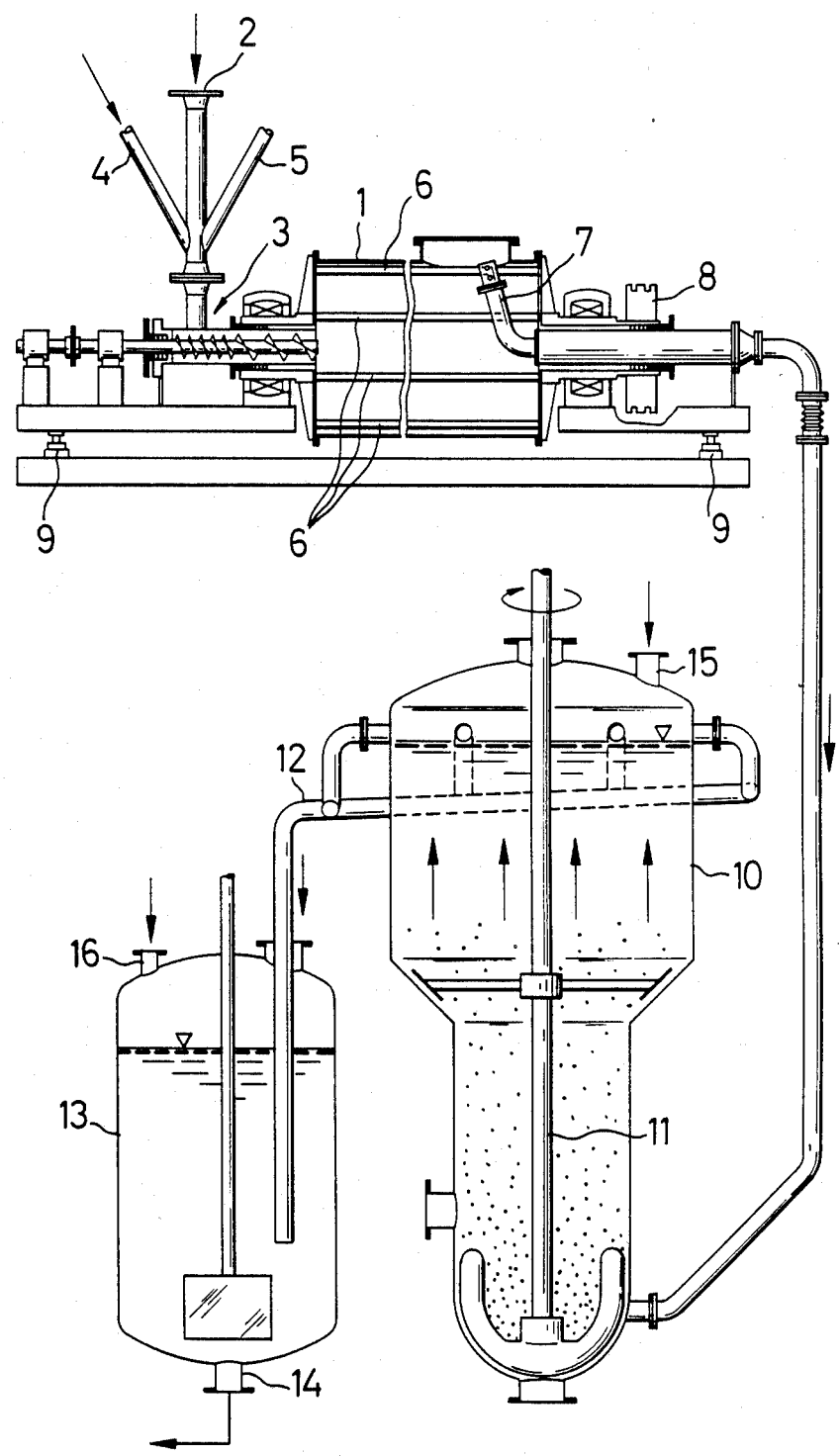

APPARATUS FOR REDUCING IRON AND VANADIUM IN PHOSPHORIC ACID SOLUTION

The present invention relates to an apparatus for reducing iron and vanadium in phosphoric acid solution, especially in wet process phosphoric acid, with the aid of a granular reductant.

It is known that iron and vanadium, and also other heavy metal ions existing in their higher oxidation stages, e.g. $U^{6+}$ and $Cr^{6+}$, in phosphoric acid solution can be reduced using a reductant which takes the form of a fixed bed.

The reductants used heretofore include e.g. ferrosilicon (U.S. Pat. No. 4,374,805), iron oxides (European Specification No. DE-A- 2 528 896) and red phosphorus (European Specification No. EP-A- 0 053 694), and the reduction has been effected in a column.

It has turned out however that the reaction which initially proceeds reliably subsides rapidly, especially in wet process phosphoric acid so that it is practically impossible for it to be carried out on an industrial scale.

The reasons for this reside inter alia in the fact that channels through which solution passes without undergoing reaction are forming in the fixed bed, and in the fact that the individual particles forming the bed become superficially encrusted with difficulty soluble material rendering them inactive. These encrustations form more or less rapidly, depending on the original of the phosphoric acid solution used.

These adverse effects can unexpectedly be avoided by using the apparatus of this invention, which is shown diagrammatically in the accompanying drawing.

With reference to the drawing:

The apparatus is comprised of a drum 1 which is rotatable around its transverse axis, partially filled-i.e. up to about 50% its volume-with granular reductant crushed to particles with a size of 1–10 mm, and provided with an inlet 4 for supplying the phosphoric acid solution, an inlet 2 for supplying the reductant, and inlet 5 for supplying an inert gas, e.g. nitrogen, and with a reaction product outlet 7.

Advantageous features of the apparatus of this invention provide:

(a) for the drum 1 to be formed with a plurality of baffle plates 6 transporting the ferrophosphorus upwardly and dropping it back through the phosphoric acid solution, while the drum is in rotation;

(b) for the inlets 2, 4 and 5 to be connected to drum 1 by means of a packing screw 3;

(c) for the outlet 7 to be a stationary overflow in upright position, terminating in the upper portion of the drum 1 and thus permitting the reaction volume to be fully utilized and the residence time of the phosphoric acid solution in the drum 1 to be prolonged;

(d) for a heat exchanger—not shown in the drawing—permitting the solution to be heated to be mounted ahead of inlet 2 supplying the phosphoric acid solution;

(e) for the drum 1 to be connected by means of a sprocket wheel 8 to a geared engine variable in speed permitting the optimum reaction speed, preferably 0.2 to 4.0 rpm, to be established; and (f) for the drum 1 to be mounted on a weighing device permitting the consumption of reductant to be determined and the consumed material to be replaced.

A further preferred feature provides for the outlet 7 to be connected to a container 10 provided with an agitator 11. In container 10, fine particulate reductant carried along with the solution coming from drum 1 is allowed to undergo post-reaction; this is a minor quantity of ferrophosphorus obtained during crushing and during the reaction in the drum. Container 10 is comprised in its lower half portion of a lower cylinder having a closed bottom end and of a conical intermediate element placed above the lower cylinder and connecting it to an upper closed cylinder having a closed upper end and being larger in diameter than the lower cylinder, the lower end of the lower cylinder being connected to the outlet 7 and the upper cylinder having an outlet 12 secured to its upper end, the outlet 12 opening into a reservoir 13 with outlet 14.

It is also advantageous to dispose an inert gas outlet 15 and 16, respectively, near the head each of container 10 and reservoir 13.

The container 10 described hereinabove makes it possible for reductant particles carried along first do deposit in the upper portion larger in diameter and then to undergo post-reaction in the lower portion smaller in diameter, the particles being kept in agitation by the agitator 11 fitted to the wall.

It is preferable for the container 10 to be provided with a double arm agitator 11, one of the two arms fitting the wall of the lower portion of the container and the other fitting the wall of the conical intermediate element.

Granular reductant encrusted and abraded during the reaction is taken from drum 1 together with the fine particulate reductant so that it is possible for the phosphoric acid solution to be directly processed, i.e. primarily neutralized, without subjecting it to intermediary filtration.

The reductants which should conveniently be used include ferrophosphorous, ferrosilicon, iron oxides and red phosphorus.

The following Example illustrates the invention which is naturally not limited thereto.

EXAMPLE

A drum 0.8 m wide and 3 m long, provided in its interior with 6 baffle plates 6, was charged with 1.6 metric tons crushed ferrophosphorus (consisting substantially of particles with a size smaller than 10 mm; fines smaller than 0.5 mm=3.8%) composed of 22.9% P, 4.7% Si, 2.4% Ti, the balance being Fe.

The drum rotating at a speed of 2 rpm was continuously fed via inlet 4 and screw 3 with 7 m$^3$/h phosphoric acid at 80°–90° C. which contained 27.9% $P_2O_5$, 123 ppm V in form of $V^{5+}$ and 0.2% Fe-total, $Fe^{2+}$ being present in a proportion of 0.02%. The phosphoric acid solution travelled through the overflow outlet 7 into the lower portion of container 10 provided with a double arm agitator 11. Fine particulate ferrophosphorus carried along with the solution was allowed to undergo post-reaction in the container and to deposit together with abraded encrusted material which was also carried along into the container. The clear solution left container 10 overhead through outlet 12 and was introduced into a reservoir 13 from which the reaction product containing 0.23 wgt % Fe-total and 0.22 wgt % $Fe^{2+}$ and 115 ppm $V^{4+}$ was taken through outlet 14.

The quantity of ferrophosphorous consumed during the reaction was determined by means of weighing device 9 and replaced by fresh ferrophosphorus through inlet 2 and screw 3. The entire reaction was effected under nitrogen. To this end, nitrogen was introduced through inlet 5 into drum 1, through inlet 16 into container 10 and through inlet 15 into reservoir 13. 725 m³ phosphoric acid was reacted within 95 hours. The reaction product was neutralized and a disodium phosphate solution was prepared therefrom. The precipitate was filtered and found to contain 18.5 wgt % $P_2O_5$, 4.6 ppm vanadium and 7 ppm iron.

We claim

1. An apparatus for reducing iron and vanadium in a phosphoric acid solution with the aid of a granular reductant comprising a drum filled with phosphoric acid and a granular reductant, means connected to rotate the drum around a substantially horizontal axis, drum inlets for supplying the phosphoric acid, the granular reductant and an inert gas, and a drum outlet for discharging reacted phosphoric acid, the drum outlet comprising a tube having a first portion disposed horizontally and axially within the drum and an upwardly directed second portion inclined so that an open upper end of this portion is adjacent to an upper portion of the interior of the rotating drum thereby permitting maintenance of the level of the phosphoric acid within the drum at the level of the open upper end of the tube and simultaneously preventing the solid granular reductant from being discharged from the drum.

2. The apparatus as claimed in claim 1, including a packing screw connecting the drum inlets to the drum.

3. An apparatus for reducing iron and vanadium in a phosphoric acid solution with the aid of a granular reductant comprising a drum filled with phosphoric acid and a granular reductant, means connected to rotate the drum around a substantially horizontal axis, drum inlets for supplying the phosphoric acid, the granular reductant and an inert gas, and a drum outlet for discharging reacted phosphoric acid, the drum outlet comprising a stationary overflow in upright position, terminating in an upper portion of the drum, permitting filling of the drum with the phosphoric acid up to a top edge of the outlet, and wherein the drum outlet is connected to a container provided with an agitator, the container comprising a lower cylinder in its lower half portion having a closed lower end, a conical intermediate portion above the lower cylinder, and an upper cylinder above the conical intermediate portion having a closed upper end and a diameter larger than the lower cylinder, the lower end of the lower cylinder having a connection to the drum outlet and the upper end of the upper cylinder having a connection to a further outlet.

4. The apparatus as claimed in claim 3, wherein the container includes a double arm agitator, one of the two arms fitting the wall of the lower portion of the container and the other fitting the wall of the conical intermediate portion.

* * * * *